(12) United States Patent
Saito et al.

(10) Patent No.: US 7,325,454 B2
(45) Date of Patent: Feb. 5, 2008

(54) ACCELERATION/ANGULAR VELOCITY SENSOR UNIT

(75) Inventors: Kazutaka Saito, Saitama (JP); Akira Nakamuta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/239,867

(22) Filed: Sep. 30, 2005

(65) Prior Publication Data

US 2006/0065050 A1 Mar. 30, 2006

(30) Foreign Application Priority Data

Sep. 30, 2004 (JP) ............ P.2004-288361

(51) Int. Cl.
*G01C 19/00* (2006.01)
(52) U.S. Cl. ............... 73/511; 73/504.03
(58) Field of Classification Search ........ 73/510, 73/504.03, 511
See application file for complete search history.

(56) References Cited

U.S. PATENT DOCUMENTS

| | | | |
|---|---|---|---|
| 5,396,326 A * | 3/1995 | Knobbe et al. | 356/255 |
| 6,195,261 B1 | 2/2001 | Babutzka et al. | 361/752 |
| 6,796,177 B2 * | 9/2004 | Mori | 73/504.02 |
| 2002/0075139 A1 * | 6/2002 | Yamamoto et al. | 340/436 |
| 2004/0200279 A1 * | 10/2004 | Mitani et al. | 73/504.03 |
| 2005/0081629 A1 * | 4/2005 | Hoshal | 73/504.03 |
| 2006/0250257 A1 * | 11/2006 | Reynolds | 340/601 |

FOREIGN PATENT DOCUMENTS

| | | |
|---|---|---|
| DE | 19720106 | 11/1998 |
| DE | 10064170 | 7/2002 |
| JP | 2000-314744 | 11/2000 |
| JP | 2002365095 A * | 12/2002 |

* cited by examiner

*Primary Examiner*—Hezron Williams
*Assistant Examiner*—Tamiko Bellamy
(74) *Attorney, Agent, or Firm*—Carrier, Blackman + Associates, P.C.; William D. Blackman; Joseph P. Carrier (57) ABSTRACT

A longitudinal G sensor 51 and a roll rate sensor 54 are mounted onto a back surface 61b of a substrate 61 in parallel with an X-axis and a lateral G sensor 52 and a pitch rate sensor 55 are mounted thereon in parallel with a Y-axis, the longitudinal G sensor 51 and the lateral G sensor 52 are positioned thereon in close vicinity to each other, and the roll rate sensor 54 and the pitch rate sensor 55 are positioned thereon in close vicinity to each other, while a vertical G sensor 53 and a yaw rate sensor 56 are mounted onto a surface 61a of the substrate 61 in orthogonal to a Z-axis and also the vertical G sensor 53 and the yaw rate sensor 56 are mounted thereon in close vicinity to each other.

11 Claims, 7 Drawing Sheets

PRIOR ART

ACCELERATION/ANGULAR VELOCITY SENSOR UNIT

BACKGROUND OF THE INVENTION

The present invention relates to an acceleration/angular velocity sensor unit capable of sensing an acceleration and an angular velocity.

The acceleration/angular velocity sensor unit provides a unit in which the acceleration sensor and the angular velocity sensor are packaged on a substrate and arranged in a small space.

A known acceleration/angular velocity sensor unit is satisfactory in practical use if just the dedicated sensor is incorporated into such unit. For instance, the acceleration sensor or the speed sensor is incorporated if the system is the navigation system, the acceleration sensor for sensing the acceleration in the lateral direction, or the like is incorporated if the system is the sideslip control system, and the steering angle sensor, the angular velocity sensor, or the like is incorporated if the system is the cruise control system.

Figure 7A:
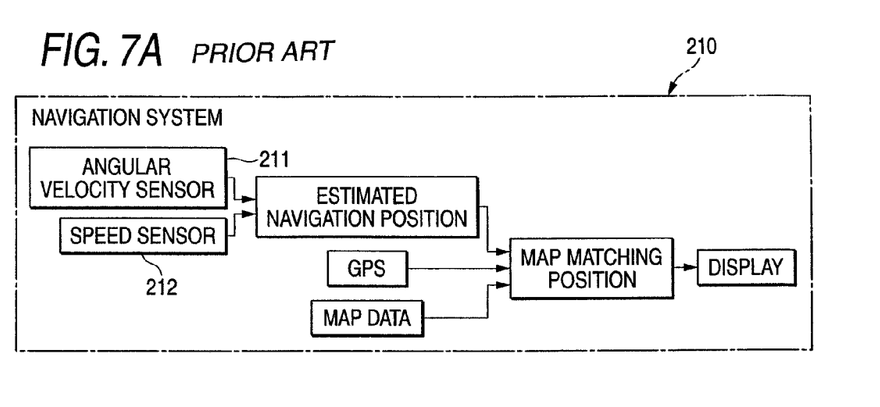
FIG. 7 is Block diagrams of the navigation system, the sideslip control system, and the cruise control system in the prior art.
Figure 7B:
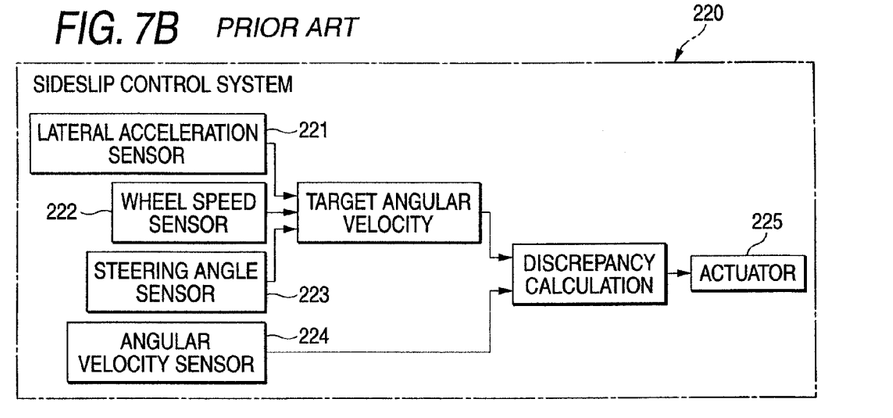
Figure 7C:
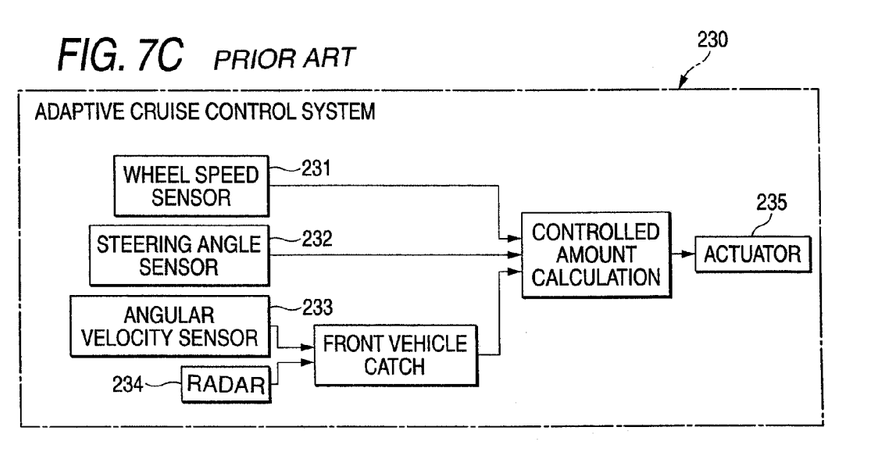

FIGS. 7A to 7C are block diagrams of the navigation system, the sideslip control system, and the cruise control system in the prior art.

In FIG. 7A, a navigation system 210 provides an angular velocity sensor 211 and a speed sensor 212 for the vehicle, and calculates an estimate navigation position based on information from the angular velocity sensor 211 and the speed sensor 212, then calculates a map matching position from the estimate navigation position, GPS (Global Positioning System) information, and map data information, and then displays this map matching position on a monitor screen, or the like.

In FIG. 7B, a sideslip control system 220 provides a lateral acceleration sensor 221, a wheel speed sensor 222, a steering angle sensor 223, and an angular velocity sensor 224 for the vehicle, and calculates a target angular velocity from information of the lateral acceleration sensor 221, the wheel speed sensor 222, and the steering angle sensor 223, then calculates an amount of discrepancy between this target angular velocity and information of the angular velocity sensor 224, and then actuates an actuator 225 based on this amount of discrepancy.

In FIG. 7C, an adaptive cruise control system 230 provides a wheel speed sensor 231, a steering angle sensor 232, an angular velocity sensor 233, and a radar 234 to the vehicle, then catches up to a preceding vehicle based on information of the angular velocity sensor 233, and the radar 234, then calculates a controlled amount from a distance to the preceding vehicle and information of the wheel speed sensor 231 and the steering angle sensor 232, and then actuates an actuator 235 based on this calculated amount.

However, the dedicated sensors are provided individually to the navigation system 210, the sideslip control system 220, and the adaptive cruise control system 230 respectively. For this reason, a sensor having the same function, for example, the angular velocity sensor 211, the angular velocity sensor 224, and the angular velocity sensor 233 provided to three systems 210 to 230 respectively, and thus is present in plural in the vehicle. Therefore, there is a drawback with this known design that the installation of respective systems 210 to 230 into the vehicle becomes complicated.

For instance, when the failure diagnosis of the sensors in respective systems 210 to 230 is taken into consideration, such failure diagnosis must be applied individually to respective systems 210 to 230. Therefore, a problem exists that the failure diagnosis of the sensors becomes difficult.

In other words, it is desired that a plurality of sensors should be integrated into one unit and the unit should be used commonly in plural systems.

As such acceleration/angular velocity sensor unit, a unit in which a plurality of acceleration sensors are mounted on the substrate is known. Such a device is disclosed, for example in JP-A-2000-314744 (page 8, FIG. 5).

Figure 8:
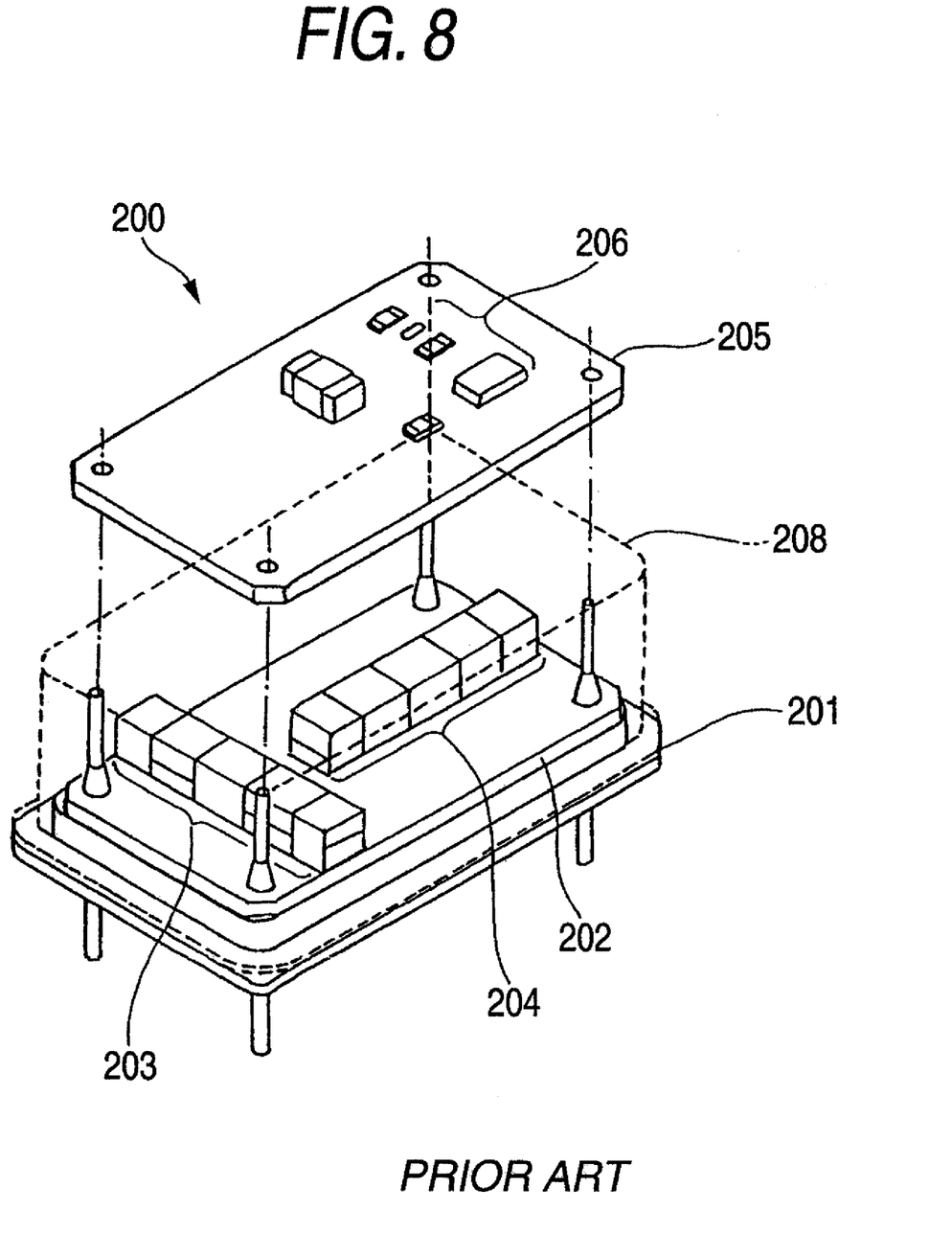
FIG. 8 is a view explaining a basic configuration of the sensor unit in the prior art.

FIG. 8 herein is a reproduction of FIG. 56 of JP-A-2000-314744 in which the reference numbers are modified explaining a basic configuration of the sensor unit in the prior art. An acceleration/angular velocity sensor unit 200 is constructed by mounting a sensor substrate 202 on a base 201, then arranging multilayer piezoelectric elements 203 as a plurality of sensors on the sensor substrate 202, and arranging multilayer piezoelectric elements 204 as a plurality of sensors on the sensor substrate 202 in orthogonal to these multilayer piezoelectric elements 203. A signal processing substrate 205 is placed on the sensor substrate 202 and the plurality of multilayer piezoelectric elements 203, 204, and then elements 206 such as resistors, capacitors, Ics, and the like are arranged on the signal processing substrate 205, and a cover 208 is put on the base 201.

However, in the acceleration/angular velocity sensor unit 200, a plurality of multilayer piezoelectric elements 203, 204 are arranged on the sensor substrate 202 and also the elements 206 are arranged on the signal processing substrate 205. Therefore, for example, the multilayer piezoelectric elements 203, 204 and the elements 206 are different in size and thus a balance of the packaging density between the sensor substrate 202 and the signal processing substrate 205 is lost. As a result, there is such a problem that the worsening of the packaging density on the sensor substrate 202 or the signal processing substrate 205 is brought about.

Also, in the acceleration/angular velocity sensor unit, the multilayer piezoelectric elements 203 as a plurality of sensors are arranged on the sensor substrate 202 and then simply the multilayer piezoelectric elements 204 are arranged on the sensor substrate 202 to intersect orthogonally with the multilayer piezoelectric elements 203. Therefore, sometimes the related sensors are packaged mutually at a distance, for example. Also, there is such a problem that reduction in a packaging precision due to the influence of bowing of the substrate, etc. is brought about.

In other words, the acceleration/angular velocity sensor unit that makes it possible to improve the packaging density and also improve the packaging precision is desired.

SUMMARY OF THE INVENTION

It is an object of the present invention to provide an acceleration/angular velocity sensor unit sensor unit that is fixed relative to an object to which it is mounted and capable of improving a packaging density of a substrate by solving the problem that the packaging density of the substrate is decreased and also further capable of improving a packaging precision of a sensor by solving the problem that the packaging precision of the sensor is worsened.

Also, it is another object of the present invention to provide an acceleration/angular velocity sensor Unit capable of finding immediately the failure of the X-direction acceleration sensor, the Y-direction acceleration sensor, the Z-direction acceleration sensor, the X-axis angular velocity sensor, the Y-axis angular velocity sensor, and the Z-axis angular velocity sensor, to improve the maintenance performance of the vehicle.

According to aspect 1 of the present invention, there is provided an acceleration/angular velocity sensor unit including: an X-direction acceleration sensor for sensing an acceleration in an X-axis direction, a Y-direction acceleration sensor for sensing an acceleration in a Y-axis direction, a Z-direction acceleration sensor for sensing an acceleration in a Z-axis direction, an X-axis angular velocity sensor for sensing an angular velocity around an X-axis, a Y-axis angular velocity sensor for sensing an angular velocity around a Y-axis, and a Z-axis angular velocity sensor for sensing an angular velocity around a Z-axis are packaged on a same substrate, where the X-axis, the Y-axis, and the Z-axis intersect orthogonally mutually, wherein the X-direction acceleration sensor, the X-axis angular velocity sensor, the Y-direction acceleration sensor, and the Y-axis angular velocity sensor are packaged on one side of a back surface or a surface of the substrate such that respective X-axes and respective Y-axes are set in parallel respectively, and the Z-direction acceleration sensor and the Z-axis angular velocity sensor are packaged on other side of the back surface or the surface of the substrate such that respective Z-axes are set perpendicularly to the other side.

For example, since the above arrangement can improve the packaging density of the substrate, such arrangement is advantageous in reducing a size of the acceleration/angular velocity sensor unit. Also, since the above arrangement can attain improvement of the packaging precision, such arrangement is advantageous in attaining the improvement of the sensing precision.

Therefore, the X-direction acceleration sensor, the X-axis angular velocity sensor, the Y-direction acceleration sensor, and the Y-axis angular velocity sensor are mounted on one side of the surface or the back surface of the substrate such that respective X-axes and respective Y-axes are set in parallel respectively, while the Z-direction acceleration sensor and the Z-axis angular velocity sensor are mounted on the other side of the surface or the back surface of the substrate such that respective Z-axes are set perpendicularly to the other side.

That is to say, the X-direction acceleration sensor, the X-axis angular velocity sensor, the Y-direction acceleration sensor, and the Y-axis angular velocity sensor are mounted on one side of the surface or the back surface of the substrate such that respective X-axes and respective Y-axes are set in parallel respectively whereas the Z-direction acceleration sensor and the Z-axis angular velocity sensor are mounted on the other side of the surface or the back surface of the substrate such that respective Z-axes are set perpendicularly to the other side. Therefore, a packaging density of the substrate can be improved.

Also, the X-direction acceleration sensor, the X-axis angular velocity sensor, the Y-direction acceleration sensor, and the Y-axis angular velocity sensor are mounted on one side of the surface or the back surface of the substrate such that respective X-axes and respective Y-axes are set in parallel respectively whereas the Z-direction acceleration sensor and the Z-axis angular velocity sensor are mounted on the other side of the surface or the back surface of the substrate such that respective Z-axes are set perpendicularly to the other side. Therefore, improvement of a vertical precision of the Z-direction acceleration sensor and the Z-axis angular velocity sensor with respect to the X-direction acceleration sensor, the X-axis angular velocity sensor, the Y-direction acceleration sensor, and the Y-axis angular velocity sensor can be achieved.

According to aspect 2 of the present invention, there is provided the acceleration/angular velocity sensor unit according to aspect 1, wherein a processor for processing respective sensed values of the X-direction acceleration sensor, the Y-direction acceleration sensor, the Z-direction acceleration sensor, the X-axis angular velocity sensor, the Y-axis angular velocity sensor, and the Z-axis angular velocity sensor is provided onto the substrate, the processor including a failure diagnosing member for diagnosing a failure of the X-direction acceleration sensor, the Y-direction acceleration sensor, the Z-direction acceleration sensor, the X-axis angular velocity sensor, the Y-axis angular velocity sensor, and the Z-axis angular velocity sensor.

Since the failure diagnosing member for diagnosing the failure of the X-direction acceleration sensor, the Y-direction acceleration sensor, the Z-direction acceleration sensor, the X-axis angular velocity sensor, the Y-axis angular velocity sensor, and the Z-axis angular velocity sensor are provided to the processor, the failure of the X-direction acceleration sensor, the Y-direction acceleration sensor, the Z-direction acceleration sensor, the X-axis angular velocity sensor, the Y-axis angular velocity sensor, and the Z-axis angular velocity sensor can be found at once.

In the invention according to aspect 1, since the X-direction acceleration sensor, the X-axis angular velocity sensor, the Y-direction acceleration sensor, and the Y-axis angular velocity sensor are mounted on one side of the surface or the back surface of the substrate such that respective X-axes and respective Y-axes are set in parallel respectively whereas the Z-direction acceleration sensor and the Z-axis angular velocity sensor are mounted on the other side of the surface or the back surface of the substrate such that respective Z-axes are set perpendicularly to the other side, a packaging density of the substrate can be improved. As a result, the above arrangement possesses the advantage that a reduction in size of the acceleration/angular velocity sensor unit can be achieved.

Also, since the X-direction acceleration sensor, the X-axis angular velocity sensor, the Y-direction acceleration sensor, and the Y-axis angular velocity sensor are mounted on one side of the surface or the back surface of the substrate such that respective X-axes and respective Y-axes are set in parallel respectively whereas the Z-direction acceleration sensor and the Z-axis angular velocity sensor are mounted on the other side of the surface or the back surface of the substrate such that respective Z-axes are set perpendicularly to the other side, improvement of a vertical precision of the Z-direction acceleration sensor and the Z-axis angular velocity sensor with respect to the X-direction acceleration sensor, the X-axis angular velocity sensor, the Y-direction acceleration sensor, and the Y-axis angular velocity sensor can be achieved. As a result, the above arrangement possesses the advantage that improvement of a sensing precision can be achieved.

Accordingly, a positional accuracy between the X-direction acceleration sensor and the Y-direction acceleration sensor both being related mutually can be maintained, a positional accuracy between the X-axis angular velocity sensor and the Y-axis angular velocity sensor both being related mutually can be maintained, and a positional accuracy between the Z-direction acceleration sensor and the Z-axis angular velocity sensor both being related mutually can be maintained. As a result, the improvement of the packaging precision of the sensors can be attained, and also the improvement of the sensing precision can be attained.

Since the failure diagnosing member for diagnosing the failure of the X-direction acceleration sensor, the Y-direction acceleration sensor, the Z-direction acceleration sensor, the X-axis angular velocity sensor, the Y-axis angular velocity sensor, and the Z-axis angular velocity sensor are provided to the processor, the failure of the X-direction acceleration sensor, the Y-direction acceleration sensor, the Z-direction acceleration sensor, the X-axis angular velocity sensor, the Y-axis angular velocity sensor, and the Z-axis angular velocity sensor can be found immediately. As a result, the above arrangement possesses the advantage that improvement in the maintenance performance of the vehicle can be achieved.

DETAILED DESCRIPTION OF THE PREFERRED EMBODIMENTS

The best mode for carrying out the present invention will be explained with reference to the accompanying drawings hereinafter. In this case, respective drawings are viewed along the direction of reference symbols.

Figure 1:
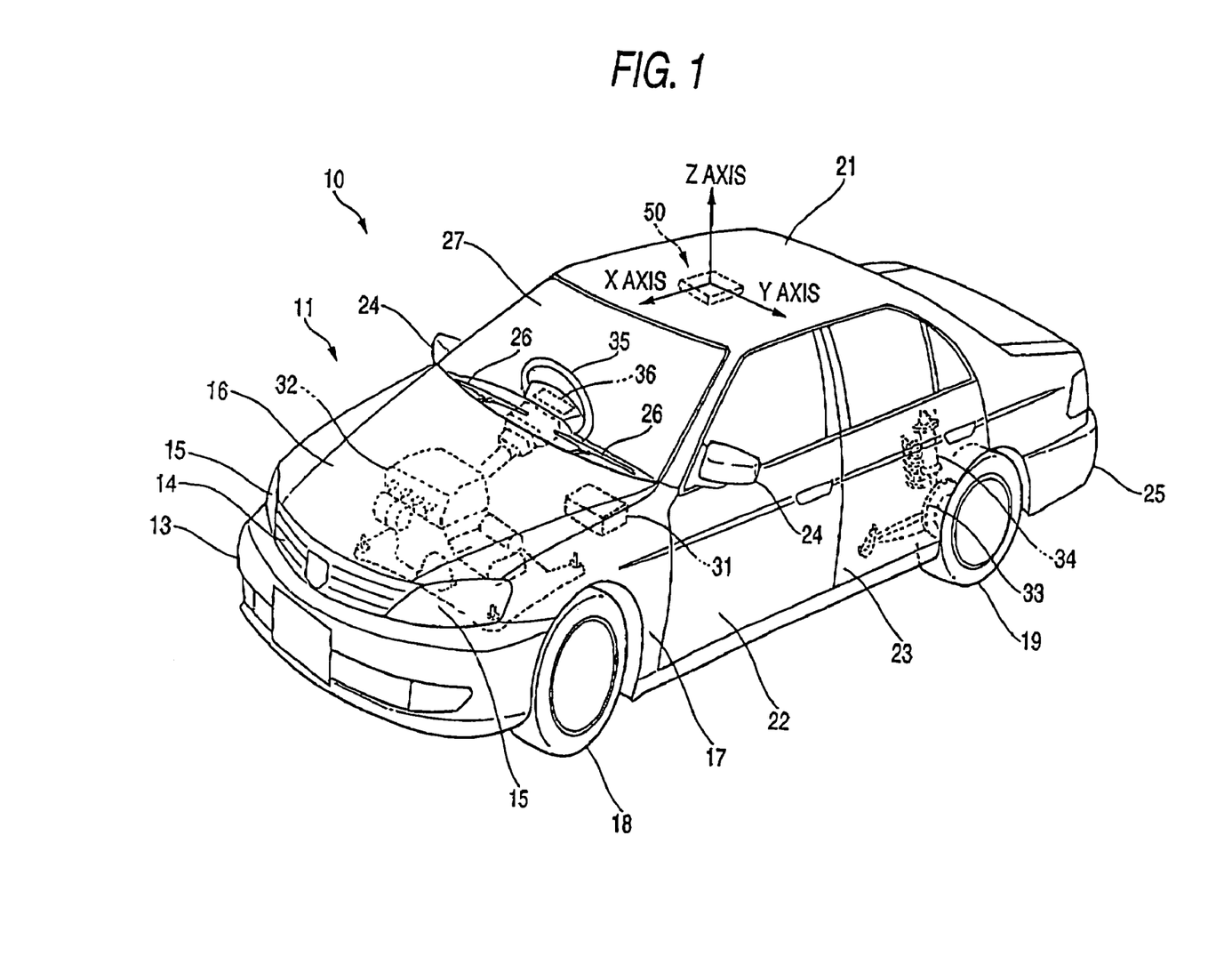
FIG. 1 is a perspective view of a vehicle that employs an acceleration/angular velocity sensor unit according to the present invention.

FIG. 1 is a perspective view of a vehicle that employs an acceleration/angular velocity sensor unit according to the present invention. In FIG. 1, a reference numeral 10 denotes a vehicle, 11 car body, 13 front bumper, 14 front grille, 15 headlamp, 16 bonnet, 17 front fender, 18 front wheel, 19 rear wheel, 21 roof, 22 front door, 23 rear door, 24 door mirror, 25 rear bumper, 26 front wiper, 27 front window, 31 control portion (ECU: Electronic Control Unit), 32 engine, 33 rear brake, 34 rear suspension, 35 power steering, 36 air bag, and 50 acceleration/angular velocity sensor unit (abbreviated as a "sensor unit 50" hereinafter) of the vehicle as the acceleration/angular velocity sensor unit.

The sensor unit 50 according to the present invention provides the unit that is arranged near the center-of-gravity position of the vehicle 10 and makes it possible to improve the packaging density and also improve the packaging precision. Also, the sensor unit 50 provides the unit that has a self-diagnosis function. Here, the longitudinal direction of the vehicle 10 is defined as the X axis, the width direction of the vehicle 10 is defined as the Y axis, and the vertical direction of the vehicle 10 is defined as the Z axis. Details will be explained hereunder.

Figure 2:
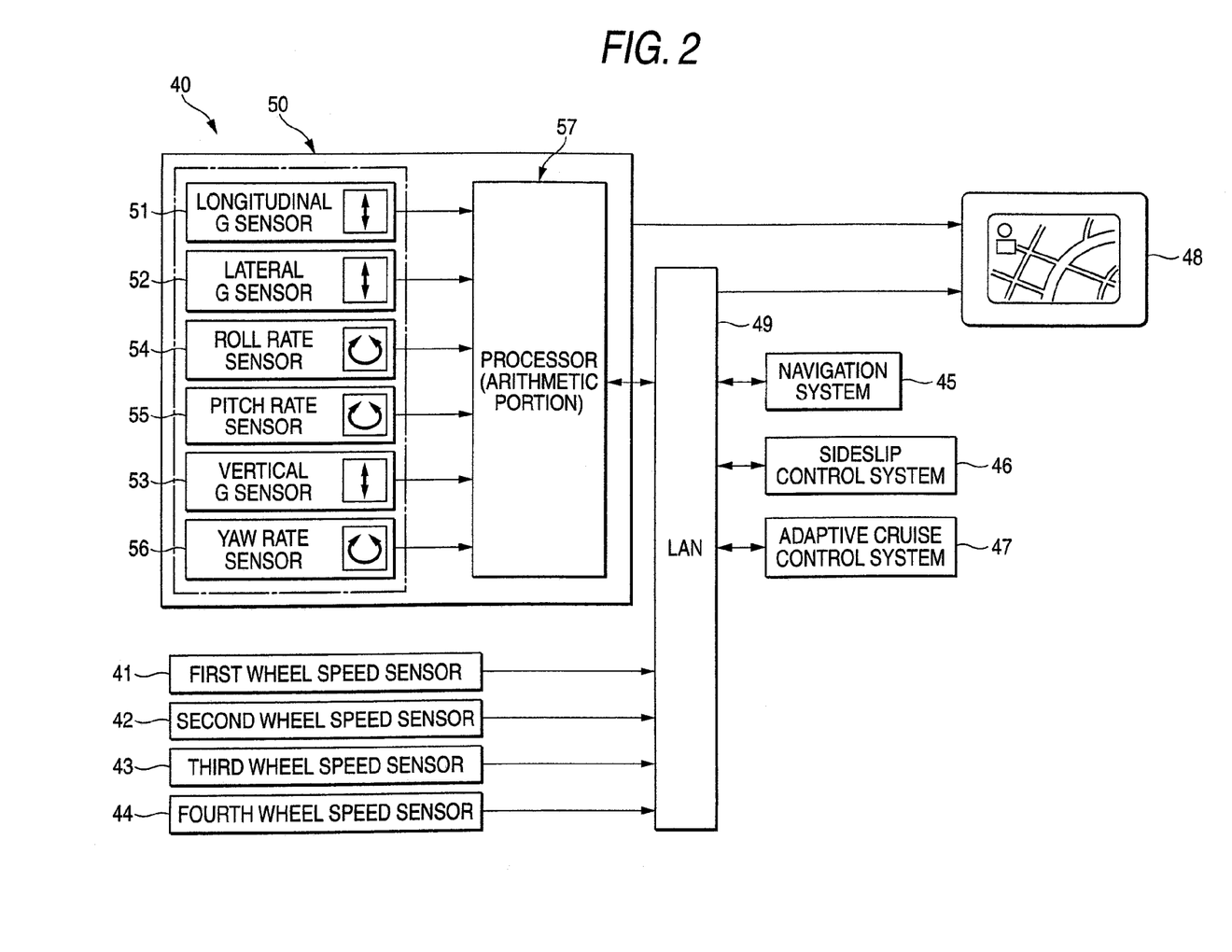
FIG. 2 is a block diagram of a peripheral equipment of the vehicle that employs the acceleration/angular velocity sensor unit according to the present invention.

FIG. 2 is a block diagram of a peripheral equipment of the vehicle that employs the acceleration/angular velocity sensor unit according to the present invention.

A peripheral equipment 40 of the vehicle includes the sensor unit 50 for sensing the acceleration and the angular velocity of the vehicle, first and second wheel speed sensors 41, 42 for sensing a speed of left and right front wheels 18, 18 of the vehicle 10 (see FIG. 1), third and fourth wheel speed sensors 43, 44 for sensing a speed of left and right rear wheels 19, 19 of the vehicle 10, a navigation system 45 for guiding the vehicle based on the signal from the GPS satellite (Global Positioning System), a sideslip control system 46 for preventing the sideslip of the vehicle, an adaptive cruise control system (auto cruise control system) 47 for executing vehicle control to keep the distance from the vehicle in front constant, keep the vehicle at a constant speed, or the like, a display system 48 for displaying vehicle information such as the abnormality (trouble display) of the navigation system, the sensor unit, and the like, and a LAN (Local Area Network) 49 for connecting the sensor unit 50, the first to fourth wheel speed sensor 41 to 44, the navigation system 45, the sideslip control system 46, the adaptive cruise control system 47, and the display system 48.

The first and second wheel speed sensors 41, 42 sense a left driving wheel speed VDL and a right driving wheel speed VDR respectively, and the third and fourth wheel speed sensors 43, 44 sense a left idler wheel speed VVL and a right idler wheel speed VVR respectively.

The navigation system 45 displays the current position of the vehicle 10 (see FIG. 1), together with guide information and map information, based on the position data obtained from the GPS signal of the GPS satellite, the position data calculated by integrating an output of the sensor unit 50 (an acceleration sensor and an angular velocity sensor), and the map information accumulated in advance in the navigation system 45.

The sideslip control system 46 determines an behavior such as an over steer state, an under steer state, or the like of the vehicle 10 by comparing target values decided based on the steering angle and the speed and sensed values such as the yaw rate, the lateral acceleration, etc., and then controls the sideslip of the vehicle by braking the outer turning wheel, braking the inner turning wheel, or the like, for example, based on the decision result to cancel the over steer or the under steer (to bring the sensed values close to the target values).

The adaptive cruise control system 47 has a distance-between-cars sensor (not shown), and executes the control to shift down the gearbox, apply automatically the brake, or the like when the distance between cars is shortened below the safe distance, in addition to the constant speed control such as the auto cruise driving, or the like.

The display system 48 is a liquid crystal display device that displays vehicle information such as information from the navigation system 45, and others thereon.

Figure 3:
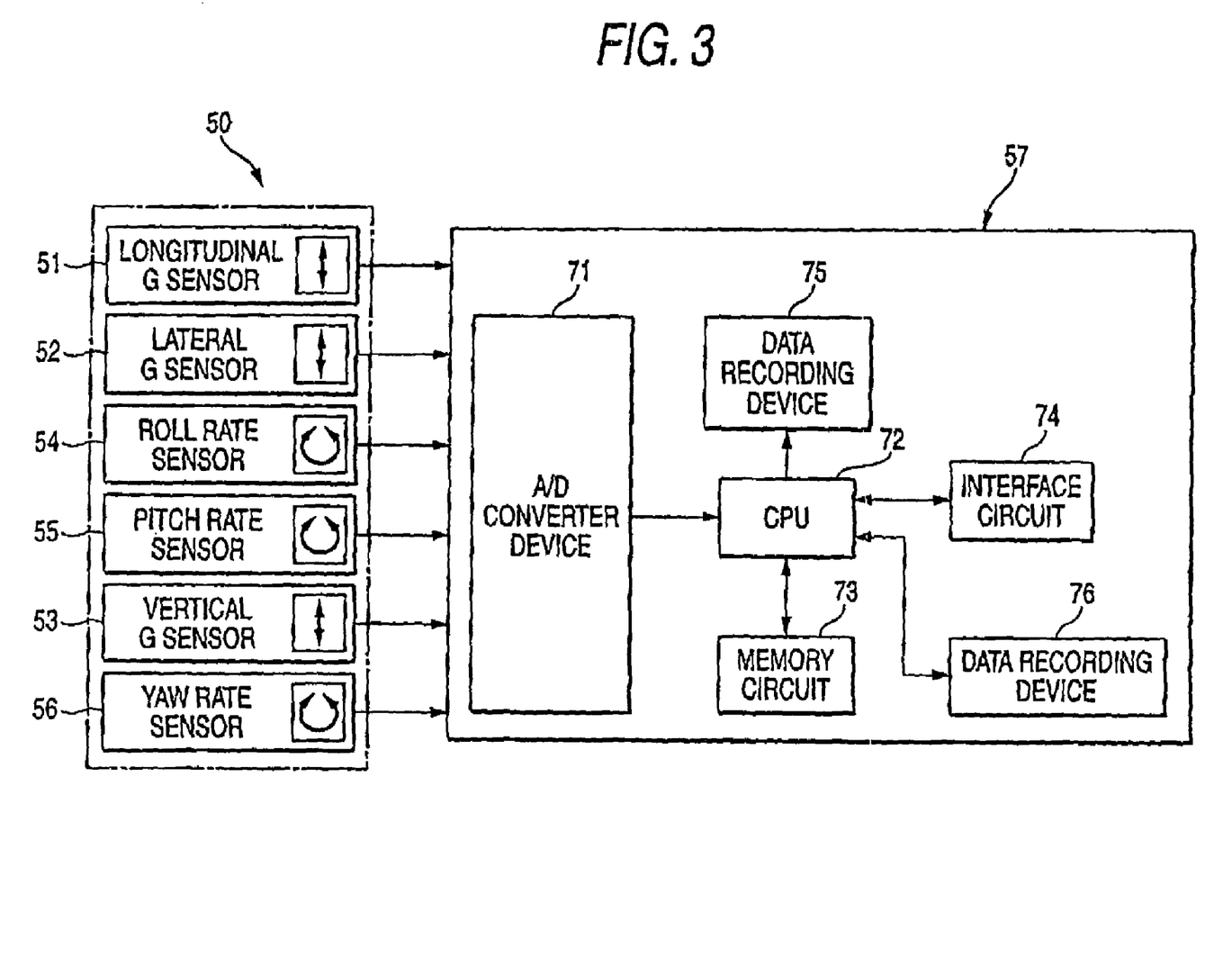
FIG. 3 is a block diagram of the acceleration/angular velocity sensor unit according to the present invention.

FIG. 3 is a block diagram of the acceleration/angular velocity sensor unit according to the present invention. The sensor unit 50 includes a longitudinal G sensor (longitudinal acceleration sensor) 51 as an X-direction acceleration sensor for sensing the acceleration in the X-axis (longitudinal axis) direction of the vehicle 10 (see FIG. 1), a lateral G sensor (lateral acceleration sensor) 52 as a Y-direction acceleration sensor for sensing the acceleration in the Y-axis (lateral axis) direction of the vehicle 10, a vertical G sensor (vertical acceleration sensor) 53 as a Z-direction acceleration sensor for sensing the acceleration in the Z-axis (vertical axis) direction of the vehicle 10, a roll rate sensor 54 as an X-axis angular velocity sensor for sensing a roll rate as the angular velocity around the X-axis, a pitch rate sensor 55 as a Y-axis angular velocity sensor for sensing a pitch rate as the angular velocity around the Y-axis, a yaw rate sensor 56 as a Z-axis angular velocity sensor for sensing a yaw rate as the angular velocity around the Z-axis, and a processor (arithmetic portion) 57 for computing the information of these sensors 51 to 56.

Now, these sensors 51 to 56 and the processor (arithmetic portion) 57 are mounted on a substrate 61 described later (see FIG. 5).

The longitudinal G sensor 51, the lateral G sensor 52, and the vertical G sensor 53 are the normal onboard low acceleration sensor that has a resolving power of about 9.8 mm/sec$^2$.

The roll rate sensor 54 and the pitch rate sensor 55 are the relatively inexpensive sensor whose stability of a middle point potential is not so high. The reason for this is that, since a roll rate ϕ and a pitch rate θ sensed by the roll rate sensor 54 and the pitch rate sensor 55 are not constantly generated continuously, these sensors can be used while applying the high-pass filter to the sensed signals.

The yaw rate sensor 56 is the sensor that senses a yaw rate ω used directly in the control such as the sideslip control, or the like. Since its stability of a middle point potential (static stability) constitutes an important factor, the relatively expensive sensor that is used in the sideslip control in the prior art and is able to ensure the stability of about ±1 deg/sec is employed.

The processor (arithmetic portion) 57 includes an A/D converter device 71 for converting output signals of the sensors 51 to 56 from the analogue signal to the digital signal, a CPU (Central Processing Unit) 72 for executing various computing processes described later, a memory circuit 73 having a ROM (Read only Memory) for storing the operation program, and the like and a RAM (Random Access Memory) for storing operation data, an interface circuit 74 used to transmit/receive the data to/from other systems via the LAN 49 (see FIG. 2), a display output circuit 75 for supplying the signals to the display system 48, and a data recording device 76 for recording the sensed data during the vehicle driving.

The CPU 72 calculates the acceleration in the longitudinal direction, the velocity in the longitudinal direction, the acceleration in the lateral direction, the velocity in the lateral direction, the acceleration in the vertical direction, the velocity in the vertical direction, a roll angle Φ as an inclination angle to the X axis (longitudinal axis) of the car body, a pitch angle Θ as an inclination angle to the Y axis (lateral axis) of the car body, and a yaw angle Ω as a rotation angle around the Z axis (vertical axis) of the car body, based on the sensed data (output signals) sensed by the sensors 51 to 56. Then, the CPU 72 supplies various calculated data to the navigation system 45, the sideslip control system 46, and the adaptive cruise control system 47, as shown in FIG. 2, via the LAN 49.

Figure 4:
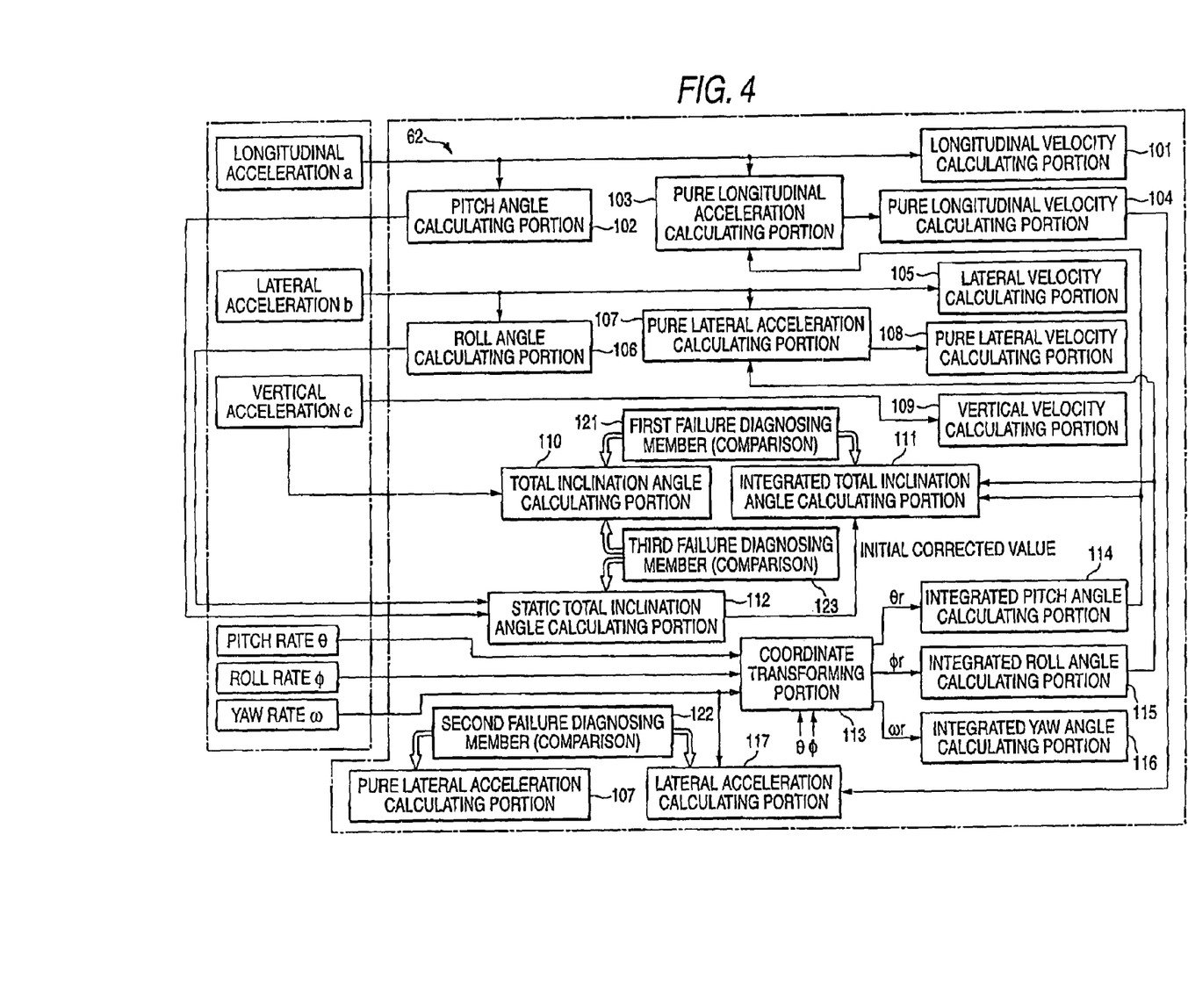
FIG. 4 is a block diagram explaining operating processes of the CPU in the processor of the acceleration/angular velocity sensor unit according to the present invention.

FIG. 4 is a block diagram explaining operating processes of the CPU in the processor of the acceleration/angular velocity sensor unit according to the present invention. The CPU 72 of the processor 57 (see FIG. 3) executes operating processes of functional blocks including a longitudinal velocity calculating portion 101, a pitch angle calculating portion 102, a pure longitudinal acceleration calculating portion 103, a pure longitudinal velocity calculating portion 104, a lateral velocity calculating portion 105, a roll angle calculating portion 106, a pure lateral acceleration calculating portion 107, a pure lateral velocity calculating portion 108, a vertical velocity calculating portion 109, a total inclination angle calculating portion 110, an integrated total inclination angle calculating portion 111, a static total inclination angle calculating portion 112, a coordinate transforming portion 113, an integrated pitch angle calculating portion 114, an integrated roll angle calculating portion 115, an integrated yaw angle calculating portion 116, a lateral acceleration calculating portion 117, and first to third failure diagnosing member 121 to 123 as the failure diagnosing means.

A longitudinal acceleration a, a lateral acceleration b, and a vertical acceleration c are sensed by the longitudinal G sensor 51 (see FIG. 3), the lateral G sensor 52, and the vertical G sensor 53 respectively. Also, the pitch rate θ, the roll rate ϕ, and the yaw rate ω are sensed by the pitch rate sensor 55, the roll rate sensor 54, and the yaw rate sensor 56 respectively. The coordinate transforming portion 113 executes the coordinate transforming operation, and calculates a converted pitch rate θr, a converted roll rate ϕr, and a converted yaw rate ωr. The integrated pitch angle calculating portion 114 calculates an integrated pitch angle Θ by integrating the converted pitch rate θr. The integrated roll angle calculating portion 115 calculates an integrated roll angle Φ by integrating the converted roll rate ϕr. The integrated yaw angle calculating portion 116 calculates an integrated yaw angle Ω by integrating the converted yaw rate ωr.

The longitudinal velocity calculating portion 101 calculates a longitudinal velocity U by integrating the sensed longitudinal acceleration a. The pitch angle calculating portion 102 calculates a pitch angle α by a following Eq. (1).

$$\alpha = a\sin(a/g) \tag{1}$$

where asine is an inverse function of sine (sin), and g is a gravitational acceleration.

The pure longitudinal acceleration calculating portion 103 calculates a pure longitudinal acceleration A by applying the sensed longitudinal acceleration a and the integrated pitch angle Θ to a following Eq. (2). A sensing error of the longitudinal acceleration due to an inclination to the lateral axis (Y axis) of the vehicle is corrected by Eq. (2).

$$A = a - g \times \sin(\Theta) \tag{2}$$

The pure longitudinal velocity calculating portion 104 calculates a pure longitudinal velocity Uc by integrating the pure longitudinal acceleration A.

The lateral velocity calculating portion 105 calculates a lateral velocity V by integrating the sensed lateral acceleration b. The roll angle calculating portion 106 calculates a roll angle β by a following Eq. (3).

$$\beta = a\sin(b/g) \tag{3}$$

The pure lateral acceleration calculating portion 107 calculates a pure lateral acceleration B by applying the sensed lateral acceleration b and the integrated roll angle Φ to a following Eq. (4). A sensing error of the lateral acceleration due to an inclination to the longitudinal axis (X axis) of the vehicle is corrected by Eq. (4).

$$B = b - g \times \sin(\Phi) \tag{4}$$

The pure lateral velocity calculating portion 108 calculates a pure lateral velocity Vc by integrating the pure lateral acceleration B. The vertical velocity calculating portion 109 calculates a vertical velocity W by integrating the sensed vertical acceleration c.

The total inclination angle calculating portion 110 calculates a total inclination angle γ by applying the sensed vertical acceleration c to a following Eq. (5).

$$65 = a\cos(c/g) \tag{5}$$

The static total inclination angle calculating portion 112 calculates a static total inclination angle γ' by applying the pitch angle α and the roll angle β sensed during the stopping of the vehicle to a following Eq. (6). A stopping condition of the vehicle is sensed by the fact that the pure longitudinal velocity Uc is "0", for example.

$$\gamma' = a \cos(\cos \alpha \times \cos \beta) \qquad (6)$$

The integrated total inclination angle calculating portion 111 calculates an integrated total inclination angle Γ by applying the static total inclination angle γ', the integrated pitch angle Θ and the integrated roll angle Φ to a following Eq. (6a)

$$\Gamma = \gamma' + a \cos(\cos \Theta \times \cos \Phi) \qquad (6a)$$

Now, the reason why the static total inclination angle γ' is applied is to execute the initial value correction. Since outputs of the roll rate sensor 54 and the pitch rate sensor 55 are "0" while the vehicle stops, the integrated total inclination angle Γ does not give an exact total inclination angle when the vehicle is stopping on the sloped road. For this reason, the initial value is corrected by adding the static total inclination angle γ'. As a result, the exact integrated total inclination angle can be derived.

The first failure diagnosing member 121 always executes a comparison between the total inclination angle γ and the integrated total inclination angle Γ, and then decides that any of the vertical G sensor 53 (see FIG. 3), the roll rate sensor 54, or the pitch rate sensor 55 is broken down when an absolute value of a difference (γ−Γ) between them exceeds a predetermined threshold value DGAMMA1.

The third failure diagnosing member 123 executes a comparison between the total inclination angle γ and the static total inclination angle γ' while the vehicle stops, and then decides that any of the longitudinal G sensor 51 (see FIG. 3), the lateral G sensor 52, or the vertical G sensor 53 is broken down when an absolute value of a difference (γ−γ') between them exceeds a predetermined threshold value DGAMMA2.

The lateral acceleration calculating portion 117 calculates a lateral acceleration R by applying the yaw rate ω and the pure longitudinal velocity Uc to a following Eq. (7).

$$R = \omega \times Uc \qquad (7)$$

The second failure diagnosing member 122 always executes a comparison between the pure lateral acceleration B and the lateral acceleration R, and then decides that any of the longitudinal G sensor 51 (see FIG. 3), the lateral G sensor 52, or the yaw rate sensor 56 is broken down when an absolute value of a difference (B−R) between them exceeds a predetermined threshold value DBR.

Figure 5:
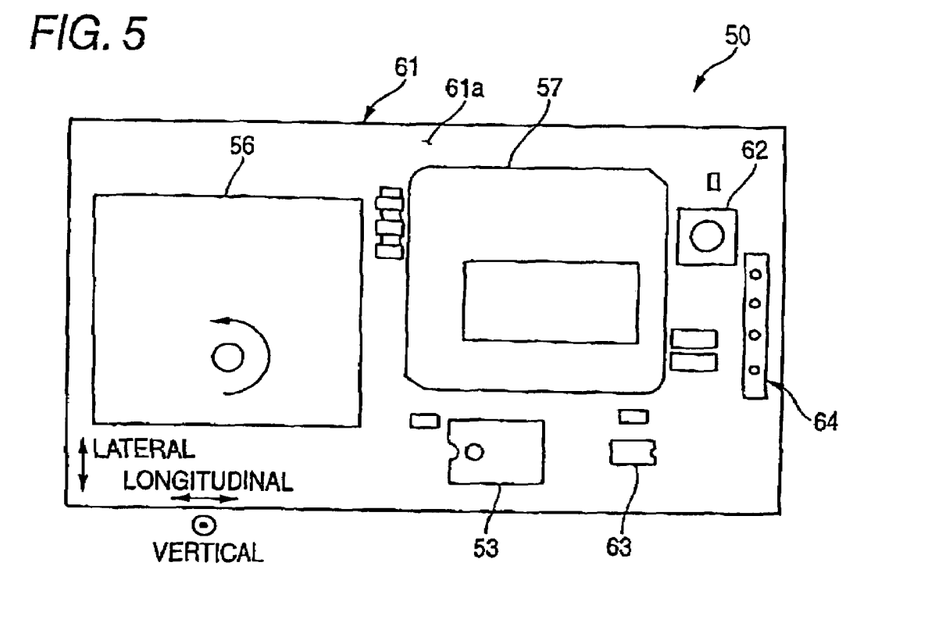
FIG. 5 is a plan view of the acceleration/angular velocity sensor unit according to the present invention.

Namely it may be said that the sensor unit (see FIG. 3) is constructed by packaging the processor 57 on the substrate 61 shown in FIG. 5, and then providing the first to third failure diagnosing member 121 to 123, which diagnose the failure of the longitudinal G sensor 51, the lateral G sensor 52, the vertical G sensor 53, the roll rate sensor 54, the pitch rate sensor 55, and the yaw rate sensor 56, onto the processor 57. Such processor 57 processes respective sensed values from the longitudinal G sensor (X-direction acceleration sensor) 51, the lateral G sensor (Y-direction acceleration sensor) 52, the vertical G sensor (Z-direction acceleration sensor) 53, the roll rate sensor (X-axis angular velocity sensor) 54, the pitch rate sensor (Y-axis angular velocity sensor) 55, the yaw rate sensor (Z-axis angular velocity sensor) 56.

Since the first to third failure diagnosing member 121 to 123 for diagnosing the failure of the longitudinal G sensor 51, the lateral G sensor 52, the vertical G sensor 53, the roll rate sensor 54, the pitch rate sensor 55, and the yaw rate sensor 56 are provided to the processor 57, the failure of the longitudinal G sensor 51, the lateral G sensor 52, the vertical G sensor 53, the roll rate sensor 54, the pitch rate sensor 55, and the yaw rate sensor 56 can be found immediately. As a result, improvement in the maintenance performance of the vehicle 10 (see FIG. 1) can be achieved.

Next, a parts mounting configuration of the sensor unit 50 will be explained hereunder.

Figure 6:
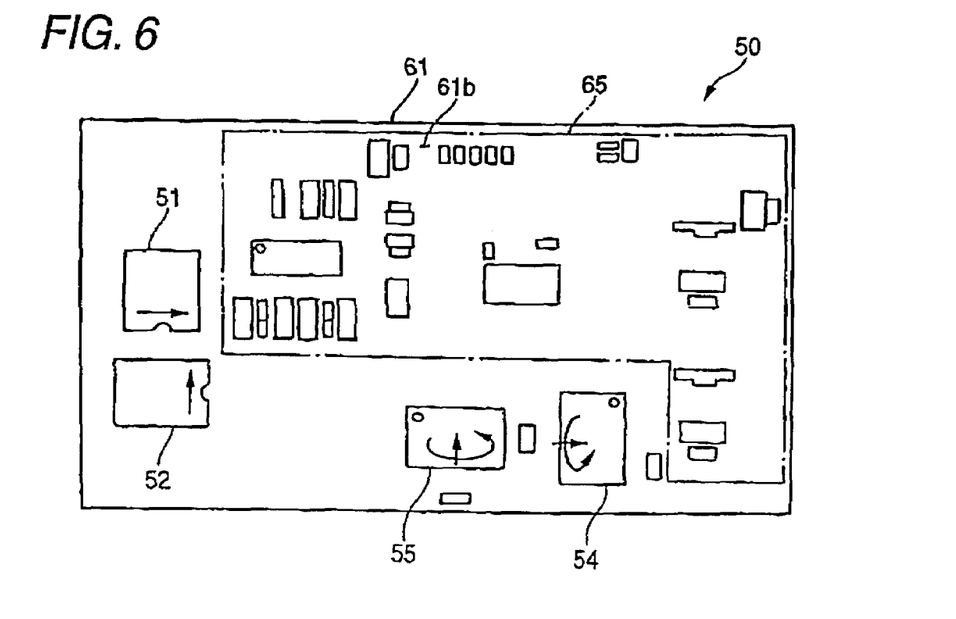
FIG. 6 is a bottom view of the acceleration/angular velocity sensor unit according to the present invention.

FIG. 5 is a plan view of the acceleration/angular velocity sensor unit according to the present invention. FIG. 6 is a bottom view of the acceleration/angular velocity sensor unit according to the present invention.

The sensor unit 50 is constructed by the almost rectangular substrate 61, the vertical G sensor 53 mounted on a surface 61a of the substrate 61 to sense the vertical acceleration (Z-axis acceleration), the yaw rate sensor 56 mounted on the surface 61a of the substrate 61 to sense the vertical angular velocity (Z-axis angular velocity; yaw rate), the processor 57 mounted on the surface 61a of the substrate 61 to execute the signal processing, a power supply IC (Integrated Circuit) 62 mounted on the surface 61a of the substrate 61 to supply the power to the processor 57, etc., a CAN (Controller Area Network) transceiver 63 mounted on the surface 61a of the substrate 61 to construct the LAN 49 (see FIG.2), and a terminal 64 mounted on the surface 61a of the substrate 61, as shown in FIG.5. The longitudinal G sensor 51 is mounted on a back surface 61b of the substrate 61 to sense the longitudinal acceleration (X-axis acceleration), the lateral G sensor 52 mounted on the back surface 61b of the substrate 61 to sense the lateral acceleration (Y-axis acceleration), the roll rate sensor 54 mounted on the back surface 61b of the substrate 61 to sense the lateral angular velocity (X-axis angular velocity; roll rate), the pitch rate sensor 55 mounted on the back surface 61b of the substrate 61 to sense the longitudinal angular velocity (Y-axis angular velocity; pitch rate), and a plurality of passive parts 65 such as resistors, capacitors, and the like mounted on the back surface 61b of the substrate 61 to, as shown in FIG.6. In this case, the substrate 61 is the double-sided substrate.

The vertical G sensor 53 and the yaw rate sensor 56 are arranged in close vicinity to each other when they are mounted on the surface 61a of the substrate 61. The longitudinal G sensor 51 and the lateral G sensor 52 are arranged adjacently to each other when they are mounted on the back surface 61a of the substrate 61. The roll rate sensor 54 and the pitch rate sensor 55 are arranged in close vicinity to each other when they are mounted on the back surface 61a of the substrate 61.

It may be said that the sensor unit 50 provides the acceleration/angular velocity sensor unit in which the longitudinal G sensor (X-direction acceleration sensor) 51 for sensing the acceleration in the X-axis direction, the lateral G sensor (Y-direction acceleration sensor) 52 for sensing the acceleration in the Y-axis direction, the vertical G sensor (Z-direction acceleration sensor) 53 for sensing the acceleration in the Z-axis direction, the roll rate sensor (X-axis angular velocity sensor) 54 for sensing the angular velocity around the X-axis, the pitch rate sensor (Y-axis angular velocity sensor) 55 for sensing the angular velocity around the Y-axis, and the yaw rate sensor (Z-axis angular velocity sensor) 56 for sensing the angular velocity around the Z-axis are packaged onto the same substrate; where the X-axis, the Y-axis, and the Z-axis intersect orthogonally with each other, and that the longitudinal G sensor 51, the roll rate sensor 54, the lateral G sensor 52, and the pitch rate sensor 55 are packaged onto the back surface 61b of the substrate 61 such that their X-axes and their Y-axes are positioned in parallel respectively whereas the vertical G sensor 53 and the yaw rate sensor 56 are packaged on the surface 61a of the substrate 61 such that their Z-axes are positioned perpendicularly to the surface 61a.

That is, the longitudinal G sensor 51, the roll rate sensor 54, the lateral G sensor 52, and the pitch rate sensor 55 are mounted onto the back surface 61b of the substrate 61 such that their X-axes and their Y-axes are positioned in parallel to the back surface 61b respectively, and also the vertical G sensor 53 and the yaw rate sensor 56 are mounted onto the surface 61a of the substrate 61 such that their Z-axes are positioned perpendicularly to the surface 61a. Therefore, the packaging density of the substrate 61 can be improved. As a result, a downsizing of the sensor unit 50 can be attained.

Also, the longitudinal G sensor 51, the roll rate sensor 54, the lateral G sensor 52, and the pitch rate sensor 55 are mounted onto the back surface 61b of the substrate 61 such that their X-axes and their Y-axes are positioned in parallel to the back surface 61b respectively, and also the vertical G sensor 53 and the yaw rate sensor 56 are mounted onto the surface 61a of the substrate 61 such that their Z-axes are positioned perpendicularly to the surface 61a. Therefore, a vertical accuracy of the vertical G sensor 53 and the yaw rate sensor 56 with respect to the longitudinal G sensor 51, the roll rate sensor 54, the lateral G sensor 52, and the pitch rate sensor 55 can be attained. As a result, improvement of a sensing precision can be attained.

In other words, it may be said that, when the longitudinal direction, the lateral direction, and the vertical direction of the vehicle 10 (see FIG. 1) are set as the X-axis, the Y-axis, and the Z-axis respectively, the sensor unit 50 provides the acceleration/angular velocity sensor unit in which the longitudinal G sensor (X-direction acceleration sensor) 51 for sensing the acceleration in the longitudinal direction of the vehicle 10, the lateral G sensor (Y-direction acceleration sensor) 52 for sensing the acceleration in the lateral direction of the vehicle 10, the vertical G sensor (Z-direction acceleration sensor) 53 for sensing the acceleration in the vertical direction of the vehicle 10, the roll rate sensor (X-axis angular velocity sensor) 54 for sensing the angular velocity around the X-axis, the pitch rate sensor (Y-axis angular velocity sensor) 55 for sensing the angular velocity around the Y-axis, and the yaw rate sensor (Z-axis angular velocity sensor) 56 for sensing the angular velocity around the Z-axis are packaged onto the same substrate 61 and that, when the substrate 61 is fitted to the vehicle 10 in such a manner that the longitudinal, lateral, and vertical directions of the substrate 61 are set along the X-axis, the Y-axis, and the Z-axis shown in FIG. 1 respectively, the longitudinal G sensor 51 and the roll rate sensor 54 are mounted onto the back surface 61b of the substrate 61 in parallel with the X-axis and the lateral G sensor 52 and the pitch rate sensor 55 are mounted thereon in parallel with the Y-axis, the longitudinal G sensor 51 and the lateral G sensor 52 are set thereon in close vicinity to each other, and the roll rate sensor 54 and the pitch rate sensor 55 are set thereon in close vicinity to each other whereas the vertical G sensor 53 and the yaw rate sensor 56 are mounted onto the surface 61a of the substrate 61 in orthogonal to the Z-axis and also the vertical G sensor 53 and the yaw rate sensor 56 are set thereon in close vicinity to each other.

For example, since the above arrangement can improve the packaging density of the substrate, such arrangement is advantageous in downsizing the acceleration/angular velocity sensor unit. Also, since the above arrangement can attain improvement of the packaging precision, such arrangement is advantageous in achieving the improvement of the sensing precision.

Therefore, the longitudinal G sensor 51 and the roll rate sensor 54 are mounted onto the back surface 61b of the substrate 61 in parallel with the X-axis and the lateral G sensor 52 and the pitch rate sensor 55 are mounted thereon in parallel with the Y-axis, the longitudinal G sensor 51 and the lateral G sensor 52 are positioned thereon in close vicinity to each other, and the roll rate sensor 54 and the pitch rate sensor 55 are mounted thereon in close vicinity to each other, while the vertical G sensor 53 and the yaw rate sensor 56 are mounted onto the surface 61a of the substrate 61 in orthogonal to the Z-axis and also the vertical G sensor 53 and the yaw rate sensor 56 are mounted thereon in close vicinity to each other. Thus, a balance of the packaging density between the surface 61a and the back surface 61b of the substrate 61 can be maintained.

Accordingly, the packaging density of the substrate 61 can be increased. As a result, a reduction in size of the sensor unit 50 of the vehicle 10 (see FIG. 1) can be achieved.

Also, because the longitudinal G sensor 51 and the lateral G sensor 52 are mounted to position closely, the roll rate sensor 54 and the pitch rate sensor 55 are mounted to position closely, and also the vertical G sensor 53 and the yaw rate sensor 56 are mounted to position closely, the sensor unit 50 is hard to accept the influence of a bowing, or the like of the substrate 61. Accordingly, a positional accuracy between the longitudinal G sensor 51 and the lateral G sensor 52 both being related mutually can be maintained, a positional accuracy between the roll rate sensor 54 and the pitch rate sensor 55 both being related mutually can be maintained, and a positional accuracy between the vertical G sensor 53 and the yaw rate sensor 56 both being related mutually can be maintained. As a result, the improvement of the packaging precision of the sensors 51 to 56 can be attained, and also the improvement of the sensing precision can be attained.

As described above, since the sensor unit 50 has the first to third failure diagnosing member 121 to 123 (see FIG. 4), improvement of the reliability of the systems 45 to 47 can also be attained.

The sensor unit 50 can be used commonly in a plurality of systems such as the navigation system 45, the sideslip control system 46, and the adaptive cruise control system 47, as shown in FIG. 2, because a plurality of sensors 51 to 56 can be put together in a single unit. As a result, simplification of the systems 45 to 47 can be achieved. Also, there is no need to execute the failure diagnose individually in the navigation system 45, the sideslip control system 46, and the adaptive cruise control system 47, and thus improvement of the maintenance performance of the systems 45 to 47 can also be achieved.

In the acceleration/angular velocity sensor unit according to the present invention, as shown in FIG. 5 and FIG. 6, the longitudinal G sensor 51 and the roll rate sensor 54 are packaged onto the back surface 61b of the substrate 61 and also the lateral G sensor 52 and the pitch rate sensor 55 are packaged thereon, while the vertical G sensor 53 and the yaw rate sensor 56 are packaged onto the surface 61a of the substrate 61. But such acceleration/angular velocity sensor unit is not limited to the above arrangement. The longitudinal G sensor 51 and the roll rate sensor 54 may be packaged onto the surface 61a of the substrate 61 and also the lateral G sensor 52 and the pitch rate sensor 55 may be packaged thereon, while the vertical G sensor 53 and the yaw rate sensor 56 may be packaged onto the back surface 61*b* of the substrate 61.

As shown in FIG. 1, the acceleration/angular velocity sensor unit according to the present invention provides the acceleration/angular velocity sensor unit 50 (the sensor unit 50) of the vehicle. But such acceleration/angular velocity sensor unit is not limited to the above sensor unit. The application of the acceleration/angular velocity sensor unit is not limited to the vehicle.

The acceleration/angular velocity sensor unit according to the present invention is suitable for use in the vehicle that is equipped with the systems such as the navigation system, the sideslip control system, the auto cruise control system, and the like.

What is claimed is:

1. An acceleration/angular velocity sensor unit comprising:
    an X-direction acceleration sensor for sensing an acceleration in an X-axis direction,
    a Y-direction acceleration sensor for sensing an acceleration in a Y-axis direction,
    a Z-direction acceleration sensor for sensing an acceleration in a Z-axis direction,
    an X-axis angular velocity sensor for sensing an angular velocity around an X-axis,
    a Y-axis angular velocity sensor for sensing an angular velocity around a Y-axis, and
    a Z-axis angular velocity sensor for sensing an angular velocity around a Z-axis,
    wherein the acceleration sensors and angular velocity sensors are all packaged on a single substrate, where the X-axis, the Y-axis, and the Z-axis intersect orthogonally mutually, wherein
    the X-direction acceleration sensor, the X-axis angular velocity sensor, the Y-direction acceleration sensor, and the Y-axis angular velocity sensor are packaged on a first surface of the substrate such that respective X-axes and respective Y-axes are set in parallel, respectively, to the first surface,
    the Z-direction acceleration sensor and the Z-axis angular velocity sensor are packaged on a second surface that is opposed to the first surface of the substrate such that respective Z-axes are set perpendicularly to the second surface, and wherein
    the X-direction acceleration sensor and the X-axis angular velocity sensor are arranged parallel to each other on the first surface of the substrate,
    the Y-direction acceleration sensor and the Y-axis angular velocity sensor are arranged parallel to each other on the first surface of the substrate, and
    the Z-direction acceleration sensor and the Z-axis angular velocity sensor are arranged parallel to each other on the second surface of the substrate.

2. The acceleration/angular velocity sensor unit according to claim 1, wherein
    a processor for processing respective sensed values of the X-direction acceleration sensor, the Y-direction acceleration sensor, the Z-direction acceleration sensor, the X-axis angular velocity sensor, the Y-axis angular velocity sensor, and the Z-axis angular velocity sensor is provided onto the substrate,
    the processor including a failure diagnosing member for diagnosing a failure of the X-direction acceleration sensor, the Y-direction acceleration sensor, the Z-direction acceleration sensor, the X-axis angular velocity sensor, the Y-axis angular velocity sensor, and the Z-axis angular velocity sensor.

3. The acceleration/angular velocity sensor unit according to claim 1, wherein the substrate is planar.

4. The acceleration/angular velocity sensor unit according to claim 1, wherein the Z-direction acceleration sensor and the Z axis angular velocity sensor are arranged in close vicinity to each other on said second surface of the substrate.

5. The acceleration/angular velocity sensor unit according to claim 1, wherein the X-direction acceleration sensor and the Y direction acceleration sensor are arranged so as to be adjacent to each other on said first surface of the substrate.

6. The acceleration/angular velocity sensor unit according to claim 1, wherein the X-axis angular velocity sensor and the Y-axis angular velocity sensor are arranged in close vicinity to each other on said first surface of the substrate.

7. A vehicle comprising an acceleration/angular velocity sensor unit according to claim 1, wherein the vehicle further comprises a navigation system, the navigation system comprising at least two sub-navigation systems, and wherein each of the at least two sub-navigation system commonly use the acceleration/angular velocity sensor unit.

8. A vehicle comprising an acceleration/angular velocity sensor unit according to claim 1, wherein the vehicle further comprises a navigation system, the navigation system comprising both a sideslip control system and a cruise control system, and wherein the sideslip control system and the cruise control system each commonly use the acceleration/angular velocity sensor unit.

9. An acceleration/angular velocity sensor unit adapted to be mounted to a vehicle comprising:
    an X-direction acceleration sensor for sensing an acceleration in an X-axis direction,
    a Y-direction acceleration sensor for sensing an acceleration in a Y-axis direction,
    a Z-direction acceleration sensor for sensing an acceleration in a Z-axis direction,
    an X-axis angular velocity sensor for sensing an angular velocity around an X-axis,
    a Y-axis angular velocity sensor for sensing an angular velocity around a Y-axis, and
    a Z-axis angular velocity sensor for sensing an angular velocity around a Z-axis,
    wherein the acceleration sensors and angular velocity sensors are all packaged on a single substrate, where the X-axis, the Y-axis, and the Z-axis intersect orthogonally mutually, wherein
    the X-direction acceleration sensor, the X-axis angular velocity sensor, the Y-direction acceleration sensor, and the Y-axis angular velocity sensor are packaged on a first surface of the substrate such that respective X-axes and respective Y-axes are set in parallel, respectively, to the first surface, and
    the Z-direction acceleration sensor and the Z-axis angular velocity sensor are packaged on a second surface that is opposed to the first surface of the substrate such that respective Z-axes are set perpendicularly to the second surface.

10. An acceleration/angular velocity sensor unit according to claim 1 wherein the sensor unit is fixed relative to an object to which it is mounted.

11. An acceleration/angular velocity sensor unit according to claim 9 wherein the sensor unit is fixed relative to a vehicle on which it is mounted.

* * * * *